United States Patent

Rundel

[15] 3,690,526

[45] Sept. 12, 1972

[54] LUGGAGE CARRIER

[72] Inventor: Albert A. Rundel, R.D. #1, Saegertown, Pa. 16433

[22] Filed: Jan. 7, 1971

[21] Appl. No.: 104,707

[52] U.S. Cl..............................224/42.07, 224/42.43
[51] Int. Cl................................................B60r 9/00
[58] Field of Search.........224/42.07, 42.08, 42.03 R, 224/42.03 A, 42.03 B, 42.43, 42.44, 42.06

[56] References Cited

UNITED STATES PATENTS

| | | | |
|---|---|---|---|
| 2,180,333 | 11/1932 | Boggia | 224/42.08 |
| 2,593,908 | 4/1952 | Monteverde | 224/42.08 |
| 3,528,578 | 9/1970 | Schoenberger | 224/42.44 X |
| 2,816,377 | 12/1957 | Hastings | 224/42.03 R X |

*Primary Examiner*—Gerald M. Forlenza
*Assistant Examiner*—Jerold M. Forsberg
*Attorney*—Charles L. Lovercheck

[57] ABSTRACT

The specification discloses a luggage carrier made up of a generally U-shaped frame. The frame has two spaced legs with a hook on the front which hooks over the bumper of an automobile. Two braces are attached to the cross member of the U-shaped member and the front portion of the braces is received on fastening means welded to the under side of the car frame. The cross members provide a supporting surface for carrying articles, boats and the like. A platform may be supported on the frame.

3 Claims, 2 Drawing Figures

PATENTED SEP 12 1972 3,690,526

Inventor
ALBERT A. RUNDEL

By
[signature] Attorney

LUGGAGE CARRIER

OBJECTS OF THE INVENTION

It is an object of the invention to provide an improved luggage carrier.

Another object of the invention is to provide a luggage carrier which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

DETAILED DESCRIPTION OF THE DRAWINGS

Figure 1:
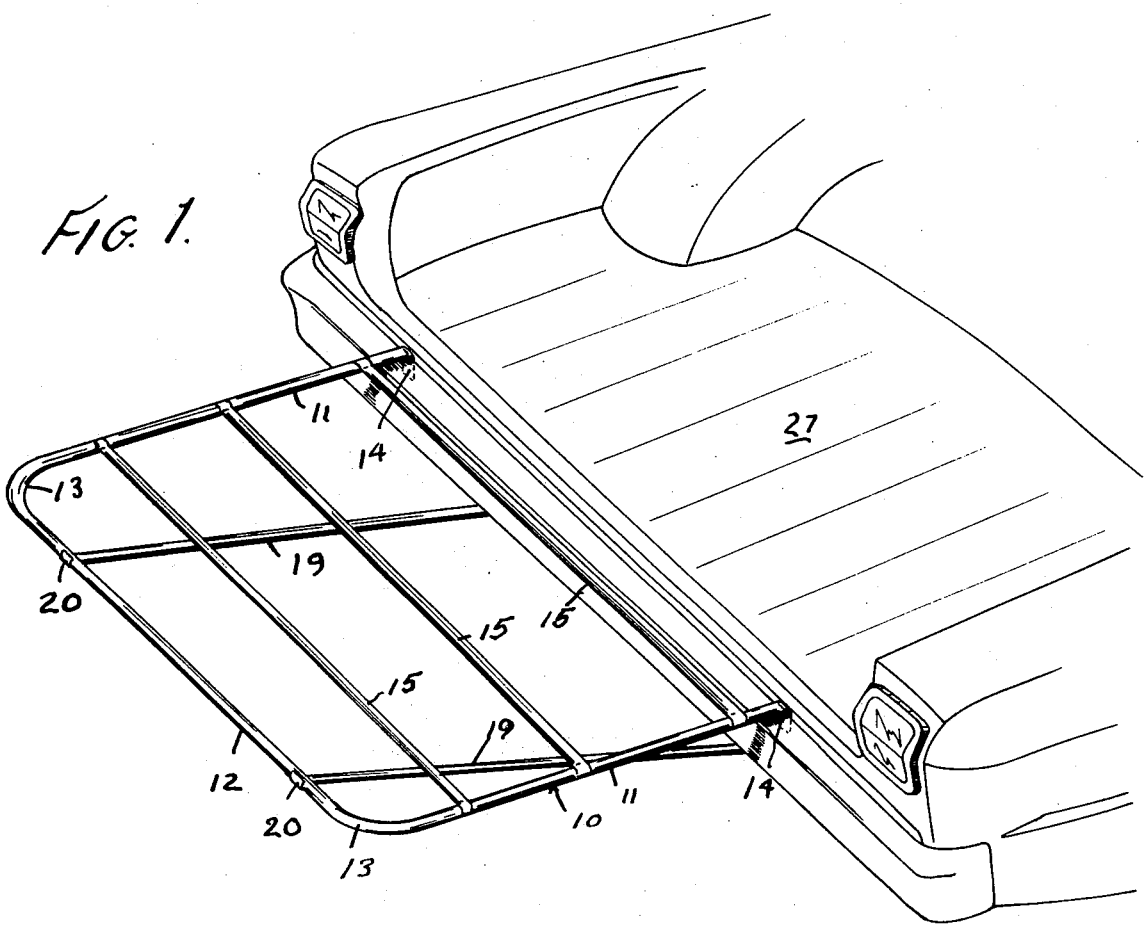
FIG. 1 is an isometric view of the carrier attached to an automobile.
Figure 2:
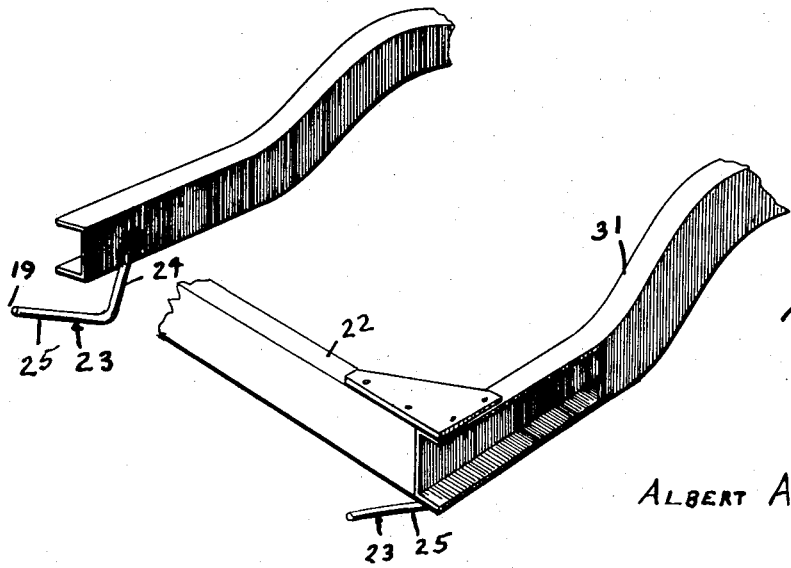
FIG. 2 is an enlarged view of the automobile frame.

The U-shaped frame of the carrier indicated generally at 10 has an intermediate part 12 connected to the legs 11 integrally by curved corners 13. The U-shaped member may be made of a tubular material with the front end flattened and bent downward to form hooks 14. The intermediate members 15 may have their ends flattened and bent around the legs 11. The brace members 19 will have their rear ends flattened and attached to the intermediate member 12 as shown. The frame 11 has the attaching member 23 thereon.

The attaching members 23 are L-shaped, having the legs 24 and 25, the leg 24 being welded to the rear end of the frame 11. The forward ends of the braces 19 are received on the attaching members 23. A relatively flat top surface is provided which is approximately on the level with the floor 27 of the trunk of the vehicle.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A carrier made up of a U-shaped tubular member having a relatively straight rear part and legs extending forwardly and having their ends flattened forming hooks to be received over a bumper or the like, transverse members generally parallel to the straight rear part of the said U-shaped member, said transverse members being fixed at their outer ends to said legs forming with said U-shaped members a flat surface, attaching members in the form of pins attached to the frame forward and below said bumper of an automobile, said pins extending upwardly and rearwardly, tubular brace members having their forward ends received on said attaching members and the rearward ends attached to said U-shaped member.

2. The carrier recited in claim 1 wherein said attaching members are welded to said frame.

3. The carrier recited in claim 2 wherein said members attaching are L-shaped.

* * * * *